July 26, 1966  M. H. DOCKEN  3,262,201
CUTTING DEVICE
Original Filed Sept. 27, 1962  2 Sheets-Sheet 1
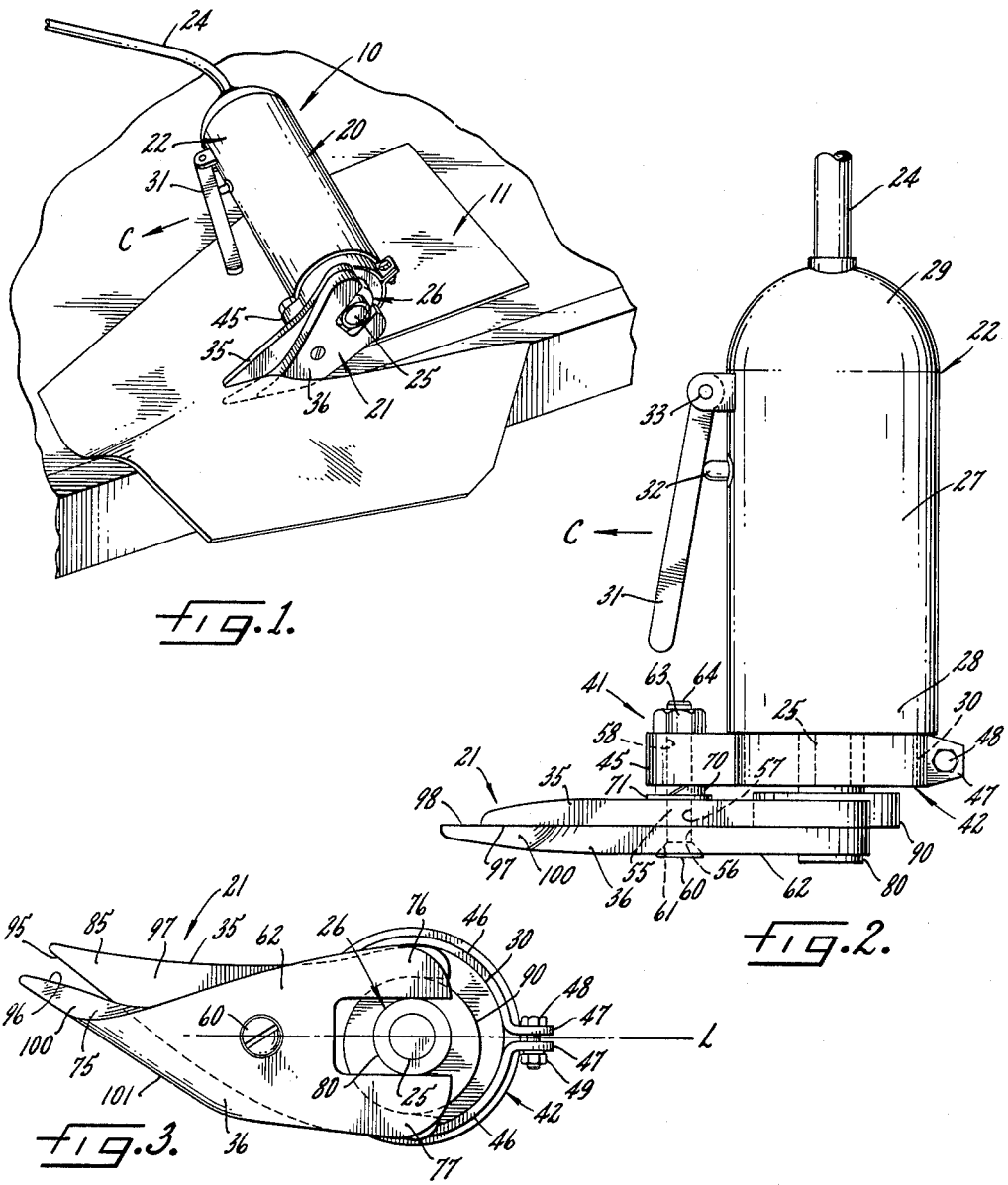
INVENTOR.
Melford H. Docken,
BY
Byron, Hume, Groen & Clement
Attorneys.

July 26, 1966  M. H. DOCKEN  3,262,201
CUTTING DEVICE

Original Filed Sept. 27, 1962  2 Sheets-Sheet 2

INVENTOR.
Melford H. Docken,
BY
Byron, Hume, Groen & Clement
Attorneys.

United States Patent Office 3,262,201
Patented July 26, 1966

3,262,201
CUTTING DEVICE
Melford H. Docken, Holcombe, Wis., assignor to W.P.B. Industrial Products, Racine, Wis., a corporation of Illinois
Continuation of application Ser. No. 226,629, Sept. 27, 1962. This application Mar. 11, 1965, Ser. No. 443,756
5 Claims. (Cl. 30—240)

This is a continuation of application Serial No. 226,629, filed September 27, 1962, now abandoned. This invention relates in general to cutting tools and more particularly to a new and improved tool arrangement for cutting relatively light, flexible materials of the broad class of fabrics, plastic sheeting, carpeting, and matting and the like.

Fabrics, for example, of both natural and synthetic composition, find innumerable adaptations in industry and elsewhere. Dressmakers, sailmakers, upholsterers, and tailors utilize them. They find widespread use in convertible automobile tops, tents, awnings, and similar applications. Similarly, plastic sheeting, carpeting, and matting and the like, have widespread uses.

Exploiting such materials frequently requires that they be cut in one way or another, often to a prescribed pattern. The conventional hand-scissors is effective to accomplish this end. However, the hand-scissor is generally inadequate when it comes to commercial applications of the materials. It is slow and tends to inconsistent cutting results. A tool which cuts with speed and accuracy is required.

Several power cutting tools for material of the aforedescribed general character are on the market, of course. None, however, combines the speed, accuracy, versatility, and reliability of a cutting tool arrangement embodying features of the present invention.

It is an object of the present invention to provide a new and improved cutting tool arrangement for materials of the general character of fabrics, plastic sheeting, carpeting, and matting and the like.

It is another object to provide a power cutting tool arrangement of the aforedescribed character which cuts rapidly and accurately.

It is still another object to provide a tool arrangement which readily cuts intricate patterns with accuracy and a minimum of effort on the part of the operator.

It is yet another object to provide a tool arrangement which is readily adapted to cutting in different attitudes and in relatively inaccessible locations.

It is still a further object to provide a tool arrangement which requires a minimum of sharpening to assure accurate, efficient, material cutting.

It is a further object to provide a cutting tool which incorporates a highly efficient and improved drive mechanism.

It is another object to provide a rotary cutting tool which utilizes an efficient, scissor-type cutting action.

The above and other objects are realized in accordance with the present invention by providing a new and improved cutting tool arrangement for more rapidly and accurately cutting materials of the aforedescribed general character. Briefly, the invention contemplates a power cutting tool arrangement which employs a scissor-type cutting action to effectively cut a fabric, for example, in any selected pattern, from simple straight line cuts to intricate curves, quickly and accurately without tearing or otherwise damaging the material in any way.

The tool arrangement facilitates cutting materials in various attitudes and in relatively inaccessible locations while keeping the point of cutting in full view of the operator to assure accurate pattern following, for example. In contrast to presently known power cutting arrangements of a broadly similar nature, a minimum amount of sharpening is required.

One form of the tool arrangement embodying features of the present invention utilizes a reciprocating scissor-type cutting action. Another form of the tool arrangement utilizes a rotary scissor-type cutting action.

The invention, both as to its organization and method of operation, taken with further objects and advantages thereof, will best be understood by reference to the following description taken in connection with the accompanying drawings, in which:

FIGURE 1 is a perspective view of one form of the cutting tool arrangement embodying features of the present invention, wherein a reciprocating scissor-type cutting action is employed;

FIGURE 2 is an enlarged plan view of the cutting tool illustrated in FIGURE 1, with parts broken away;

FIGURE 3 is an end elevational view of the cutting tool illustrated in FIGURES 1 and 2;

FIGURE 4 is a plan view of the inner blade on the cutting tool illustrated in FIGURES 1-3;

Figure 5:
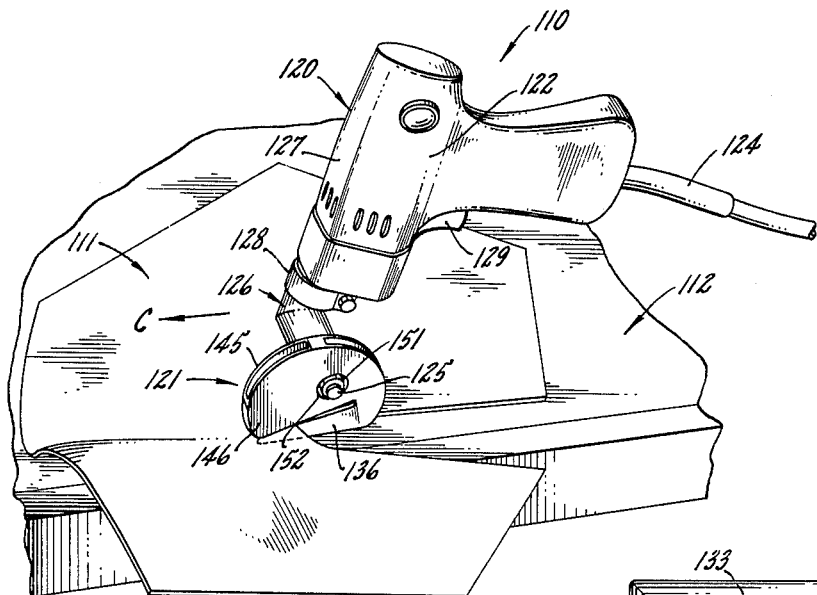
FIGURE 5 is a perspective view of another form of the cutting tool arrangement embodying features of the present invention, wherein a rotary scissor-type cutting action is employed.

Referring now to the drawings, and particularly to FIGURE 1, a cutting tool embodying features of one form of the present invention, is illustrated generally at 10. The cutting tool 10 is shown in operative relationship with a piece of material 11, which might be awning fabric, for example, resting on a supporting surface 12.

On the other hand, the material 11 might be an upholstery fabric, or carpeting, or the like, or a rubber, plastic, or matted composition material. The descriptive use of awning fabric is merely exemplary.

The cutting tool 10 employs a reciprocating scissor-type cutting action, operating at a substantially high rate of speed, to efficiently and accurately cut the material 11 in any pattern desired. The tool 10 is readily adaptable to utilization in virtually any attitude. This adaptability facilitates getting at material in otherwise relatively inaccessible quarters. Furthermore, the tool 10 embodying features of the one form of the present invention can operate for a substantial period of time without sharpening.

Turning for a moment to FIGURE 5, a cutting tool embodying features of another form of the present invention is illustrated generally at 110. The cutting tool 110 is shown in operative relationship with a piece of material 111, which might be of the same general character as the material 11 hereinbefore referred to, resting on a supporting surface 112. In contrast to the reciprocal scissor-type cutting action of the tool 10, the cutting tool 110 employs a rotary scissor-type cutting action to accurately and efficiently cut a prescribed pattern, for example, from the material 111. The tool 110 is also readily adaptable to utilization in virtually any attitude facilitating reaching relatively inaccessible locations, if necessary.

The cutting tool 110 cuts more rapidly than the cutting tool 10 hereinbefore generally discussed. Nevertheless, the cutting action of the cutting tool 110 is such that it can be operated for a considerable service life without sharpening. Furthermore, the sharpening operation, when it becomes necessary, is extremely simple and its accomplishment assures another long period of service life before sharpening is again necessary.

Referring once more to FIGURE 1, and the cutting tool 10 embodying features of the one form of the present invention, it will be seen to comprise a power unit 20 operatively connected in driving relationship with a cutting head assembly 21. The power unit 20 includes a conventional air motor 22. The air motor 22 receives air under pressure through the supply hose 24, employing a stream of air under pressure delivered from the hose 24 to impart rotation to an output shaft 25, as seen in FIGURE 2, in a conventional manner. The output shaft 25 carries an eccentric drive assembly 26 which, upon rotation of the shaft 25, is effective to drive the cutting head assembly 21 in a reciprocal scissor-type cutting action.

Referring specifically to FIGURE 2, the air motor 22 has a generally cylindrical body 27 from which the shaft 25 extends in axial relationship at one end 28, and into which the hose 24 extends at the opposite end 29. A reduced diameter cylindrical neck 30 is formed at the one end 28 of the body 27 in surrounding concentric relationship with the shaft 25, and the cutting head assembly 21 is releasably mounted on the cylindrical neck 30 for removal or selective adjustment about the axis of the body 27. By varying the radial relationship of the cutting head assembly 21 with the axis of the power unit 20, the tool 10 can be operated in varying attitudes as held by the operator and moved into otherwise relatively inaccessible locations.

The tool 10 is normally moved in the direction C as it cuts, however, the power unit 20 being energized by squeezing an actuation lever 31 against the body 27 to bias an actuation pin 32 inwardly and admit air to the unit 20 under pressure from the hose 24, in a well known manner. This initiates rotation of the shaft 25, which, in turn, actuates the cutting head assembly 21, through the eccentric drive assembly 26, as has been pointed out. As will be noted, the actuation lever 31 is pivotally mounted on the body 27 at 33.

The cutting head assembly 21 includes an inner cutting blade 35 and an outer cutting blade 36 mounted on a pin assembly 41 which is fixedly secured to a collar 42 adjustably mounted on the reduced diameter cylindrical neck 30 of the body 27. Upon the power unit 20 being actuated in the manner discussed above, to turn the drive shaft 25, the cutting blades 35 and 36 are reciprocated relative to each other by the rotating eccentric drive assembly 26.

The collar 42 comprises a bushing portion 45, which receives the pin mounting assembly 41, and a pair of segmentally cylindrical arms 46 extending from the bushing portion 45 and encircling the reduced diameter cylindrical neck 30 of the body 27. Substantially identical ears 47 formed on corresponding free ends of the arms 46 facilitate clamping the attachment collar 42 tightly to the neck 30 in any prescribed position of the cutting head assembly 21 relative to the body 27. A screw 48 passing through appropriately formed apertures (not shown) in the ears 47 receives a lock nut 49 to tighten the arms 46 on the neck 30. As can well be understood, by merely loosening the lock nut 49, the collar 42 and consequently the pin assembly 41 are readily rotated axially about the drive shaft 25. Correspondingly, the axis about which the inner cutting blade 35 and the outer cutting blade 36 pivot in reciprocation relative to each other is rotated about the axis of rotation of the shaft 25. It follows then that the cutting head assembly 21 is readily adjusted relative to the power unit 20 so that the tool 10 can be used in virtually any attitude while the operator holds it in a comfortable manner.

The pin assembly 41, which carries the blades 35 and 36, includes a pin 55 extending through appropriately formed passages 56 and 57 in the outer blade 36, and the inner blade 35, respectively, and through a corresponding bore 58 in the bushing portion 45 on the collar 42. As seen in FIGURE 2, a frusto-conical head 60 is formed on one end of the pin 55 and seats in a countersunk depression 61 surrounding the passage 56 on the outer face 62 of the outer blade 36. In turn, a locking nut 63 screws on the threaded opposite end 64 of the pin 55 while an expansion washer 70 and a bearing washer 71 encircle the pin 55 between the inner blade 35 and the bushing portion 45.

The apertures 56 and 57 in the blades 36 and 35, respectively, are slightly larger in diameter than the diameter of the pin 55, and consequently the blades pivot readily about the axis of the pin 55. The expansion washer between the blades 35, 36, and the bushing portion 45 of the collar 42, is effective to bias the blades 35 and 36 together to assure effective scissor-type cutting action therebetween.

The outer cutting blade 36 has a working portion 75 formed at one end and an opposed pair of jaws 76, 77, formed on the opposite end. The jaws 76, 77, snugly bracket a concentric ring 80 of the eccentric drive assembly 26. Since the ring 80 is concentric it will be obvious that the outer blade 36 does not pivot relative to the pin 55 as the drive shaft 25 rotates. However, such is not the case with the inner blade 35.

Referring specifically to FIGURE 5, the inner blade 35 is seen to comprise a working portion 85 on one end and a pair of oppositely disposed jaws 86, 87, on the opposite end. The jaws 86, 87, snugly bracket the eccentric ring 90 of the eccentric drive assembly 26 fixedly secured to the drive shaft 25. The eccentric ring 90, as seen in FIGURE 2, is larger than the concentric ring 80 and substantially unitary therewith. As the ring 90 rotates, it pivots the inner blade 35 about the pin 55 in a reciprocating fashion relative to the outer blade 36. Accordingly, material which is introduced between the working portions 75 and 85 of the outer blade 36 and the inner blade 35, respectively, is expeditiously cut by the blade's action.

The actual cutting is accomplished between a lower cutting edge 95 on the working portion 85 of the inner blade 35 and an upper cutting edge 96 on the working portion 75 of the outer blade 36, as could well be expected. Accordingly, the outer face 97 of the inner blade 35 and the inner face 98 of the outer blade 36, are substantially planar. To facilitate unimpeded passage of the material 11 past the cutting tool 10 as the blades 35 and 36 cut the material, the working portion 75 of the outer blade 36 is formed in such a manner that its outer surface curves down and away from the cutting edge, as seen at 100 in FIGURES 2 and 3. Furthermore, the working portions 75 and 85 are inclined upwardly from the longitudinal axis L of the blades, as seen in FIGURE 3, to facilitate sliding the bottom surface 101 of the fixed outer blade working portion 75 flat on the supporting surface 12 as the operator holds the tool and moves it in the direction C while cutting the fabric 11.

To operate the tool 10, the operator grasps it about the generally cylindrical body 27, places the tool in appropriate relationship with the fabric 11 as seen in FIGURE 1, and squeezes the lever 31 as the tool is moved forwardly in the direction C. The compressed air delivered from a source (not shown) to the motor unit 20 through the hose 24 turns the shaft 25, which in turn rotates the eccentric drive assembly 26. Rotation of the eccentric drive assembly 26 moves the inner blade 36 in reciprocating fashion relative to the outer blade 35 to effect a scissor-type cutting action.

Should it be desirable to replace the cutting head assembly 21, it is a simple matter to loosen the lock nut 49 on the collar 42 and remove the cutting assembly 21. In like manner, the radial relationship of the longitudinal axis L of the blades 35 and 36 to the axis of rotation of the drive shaft 25 is readily varied by merely loosening the lock nut 49 and rotating the collar 42, which supports the blades 35 and 36 about the reduced diameter neck 30 upon which the collar 42 is mounted. Accordingly, the relationship of the cutting head assembly 21 and the power unit 20 is readily adjusted to facilitate handling the tool 10 in an appropriate manner to cut in virtually any attitude and reach into relatively inaccessible locations to cut materials.

Turning now to FIGURES 5–8, the cutting tool 110 embodying features of the other form of the present invention is illustrated in substantial detail. As has been pointed out, the cutting tool 110 is shown in operative relationship with a piece of material 111, preferably of the general character of the material 11 hereinbefore discussed, resting on the supporting surface 112.

In contrast to the cutting tool 10, the cutting tool 110 employs a rotary scissor-type cutting action. This rotary action facilitates cutting at substantially high speeds, while nevertheless assuring that the pattern is followed accurately without interruption. The operation of the cutting tool 110 is such that it does not require sharpening for substantially long periods of service, and when sharpening is required, it is a substantially simple operation.

Referring now specifically to FIGURE 5, the tool 110 is seen to comprise a power unit 120 operatively connected in driving relationship with a cutting head assembly 121. The power unit 120 includes a conventional electric motor 122 which is energized from a source of electrical current (not shown) through a conductor 124. Energization of the electric motor 122 imparts rotation to an output shaft 125 through the medium of a right angle drive assembly 126 of well known construction. Rotation of the shaft 125 is effective to institute rotary scissor-type cutting action by the cutting head assembly 121. The motor 122 has a generally pistol-shaped body 127 which might have the right angle drive assembly 126 formed integrally therewith, or, as illustrated, appropriately connected to it in any well known manner, as by a ring clamp 128. To actuate the motor 122 and consequently turn the drive shaft 125 through the right angle drive assembly 126, a trigger 129 is squeezed in a well known manner. The operator then normally moves the tool 110 in the direction C, as shown in FIGURE 5, to cut the material 111.

Referring specifically to FIGURE 2, the right angle drive assembly 126, which joins the cutting head assembly 121 at its outer extremity, includes a cylindrical neck portion 130, upon which the cutting head assembly 121 is, in part, mounted. The neck portion 130 is joined by welding or the like at right angles to another cylindrical neck portion 131. The angularly disposed cylindrical neck portion 131 is preferably joined to the body 127 of the motor 122 by the clamp 128, as has been pointed out.

The cylindrical neck portion 130 encloses the output drive shaft 125 while the neck portion 131 encloses a direct drive output shaft 132 from the motor 122. A conventional bevel gear arrangement 133 transmits the rotational energy of the shaft 132 to that of the output shaft 125 in a well known manner.

The cutting head assembly 121 is mounted on the cylindrical neck portion 130 for removal therefrom or selective adjustment about the axis of the neck portion 130. By varying the radial relationship of the cutting head assembly 121 with the axis of the cylindrical neck portion 130 (and the output shaft 125) the tool 110 can be operated in varying attitudes as held by the operator and moved into otherwise inaccessible locations, similarly to the tool 10 hereinbefore discussed.

Figure 6:
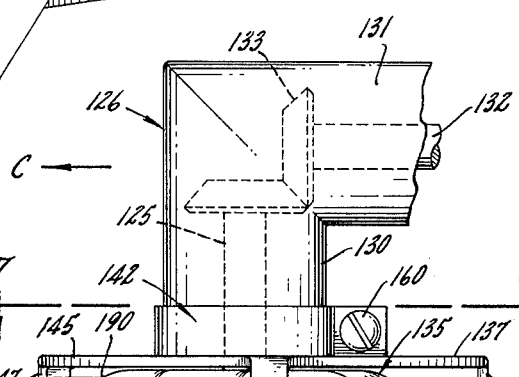
FIGURE 6 is an enlarged plan view of the head of the cutting tool illustrated in FIGURE 5, with parts broken away.
Figure 7:
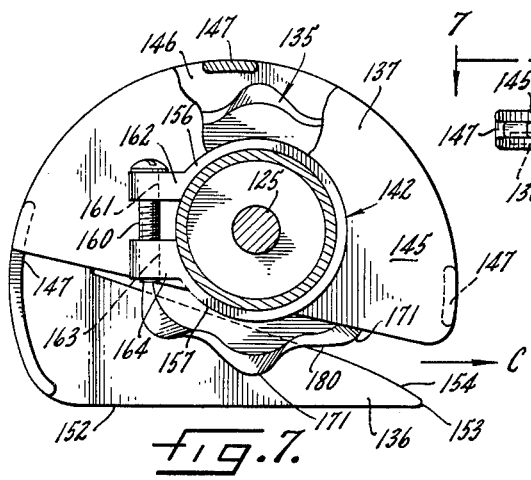
FIGURE 7 is a sectional view taken along line 7—7 of FIGURE 6, with parts broken away.

Referring now primarily to FIGURES 6 and 7, the cutting head assembly 121 includes a rotary inner cutting blade 135 secured to the shaft 125 for rotation therewith. The assembly 121 further includes a combination fixed outer cutting blade 136 and housing 137 secured to a collar 142 adjustably mounted on the cylindrical neck portion 130. When the power unit 120 is actuated in the foregoing manner, to turn the drive shaft, the inner cutting blade 135 is rotated relative to the outer cutting blade 136. The blades 135 and 136 cooperate in a rotary scissor-type cutting action of the material 111.

The housing 137 actually encloses the rotary inner blade 135 between an inner wall 145 and an outer wall 146 secured together by three narrow attachment strips 147. The inner blade 135 thus rotates within the confines of the walls 145 and 146 in cutting relationship with the fixed outer blade 136. By securing the inner and outer walls together with the three relatively narrow attachment strips 147, the operator is able to look downwardly between the inner wall 145 and the outer wall 146 to the point where inner blade 135 engages the outer blade 136 in cutting relationship. Thus he can readily observe the point of cutting and follow a pattern line or intricate pattern without difficulty.

The inner rotary blade 135 is removably held on the drive shaft 125 by a conventional machine nut 151, as best seen in FIGURE 1. A generally circular cutout 152 is provided in the outer wall 146 of the housing 137 to receive the end of the shaft 125 and the nut 151 and facilitate free rotation thereof.

Figure 9:
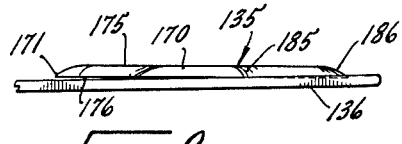
FIGURE 9 is a plan view illustrating the relationship between the cooperating cutting blades of the cutting tool seen in FIGURES 5-8.

The outer blade 136 is preferably formed from the outer wall 146 of the housing 137, as best seen in FIGURES 5 and 7. The blade 136 includes a generally flat bottom 152, upon which the tool 110 slides in cutting relationship with the fabric 111. Inclined upwardly from the leading edge point 153 of the blade 136 is the cutting edge 154 thereof. The cutting edge 154 is inclined at a predetermined angle from the base 152 of the outer blade 136, to facilitate maintenance of an optimum cutting relationship between the rotary blade 135 and the fixed blade 136, as will hereinafter be discussed in detail. In addition, as best seen in FIGURES 6 and 9, the outer blade 136 is bent slightly inwardly from the plane of the outer wall 146 from which it is formed, to continually urge the cutting edge 154 against the rotary cutting blade 135 in optimum cutting relationship.

The combination fixed outer cutting blade 136 and housing 137 is clamped on the neck portion 130 of the right angle drive assembly 126 with the attachment collar 142, which is secured to the inner wall 145 of the housing in appropriate manner, as by welding, for example. The collar 142 includes an upper section 156 secured to the wall 145, as seen in FIGURE 6, and a lower section 157 freely extending from the upper section 156. With the collar encircling this cylindrical neck portion 130, the section 157 is drawn toward the section 156 to clamp the collar 142 tightly to the neck portion 130 in any prescribed position of the cutting head assembly relative to the body 127 of the power unit 120.

Clamping is accomplished with a locking screw 160 passing through an aperture 161 in an ear 162 extending from the section 156. The screw 160 is received in an appropriately threaded aperture 163 in the ear 164 extending from the section 157 and is effective to tighten the arms on the neck 130. By merely loosening the locking screw 160, the collar 155 and consequently the combination outer cutting blade 136 and housing 137 are readily rotated axially about the cylindrical neck portion 130. It follows then that the cutting head assembly 121 is readily adjusted relative to the power unit 20 to cut in varying attitudes while the operator holds the tool 110 in a comfortable position.

Figure 8:
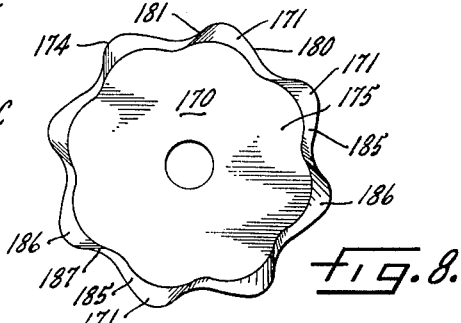
FIGURE 8 is an elevational view of the rotary blade for the cutting tool illustrated in FIGURES 5-7.

The inner blade 135 is a substantially circular metal disc 170, upon which a plurality of cutting lobes 171 are peripherally formed to cooperate with the cutting edge 154 of the outer blade 136 in a novel and highly advantageous manner. Referring specifically to FIGURE 8, the lobes 171 are formed on the disc 170 by relieving the periphery of the disc in an appropriate manner, as by grinding. A sharp cutting edge 174 is formed around the disc on the peripheries of the lobes 171 by relieving the inner surface 175 of the disc at each lobe in a prescribed manner. The profile of each lobe and its relieved surface configuration are factors which contribute to the unique cutting action of the tool member 110 embodying features of the other form of the present invention, as will hereinafter be discussed in detail. The opposite surface 176 of the disc 170 is substantially planar, of course, as seen in FIGURES 6 and 9.

Each lobe 171 includes a leading edge 180 which has a slightly but increasingly curved profile as the outer end of the lobe is approached. This leading edge effects the cutting action in cooperation with the fixed outer blade 136. Each lobe 171 further includes a trailing edge 181 over which the material 111 passes as it is separated upon being cut. As indicated in FIGURE 8, extending inwardly from each leading edge 180 to the inner surface 176 of the disc 170 is a central relieved face 185 disposed at an angle of in the neighborhood of about 30° from the surfaces 175 and 176. It has been found that an angle of inclination of in the neighborhood of about 30° in the area of this central relieved face 185 is effective to assure the most efficient cutting of the material 111.

Adjacent the outermost portion of each of the lobes 171, an intermediate face 186 extends inwardly from the cutting edge 174 at an angle of in the neighborhood of about 15° to the surfaces 175 and 176, as also indicated in FIGURE 8. This angle of inclination of the intermediate face 186 extending around the outermost portion of each lobe 171 has proven, in practice, to effect the most efficient cutting of material 111 by the tool 110.

Moving onto the trailing edge 181 of each lobe 171, a trailing edge face 187 is inclined at an angle of in the neighborhood of about 45° to the surfaces 175 and 176. Once more, it has been found that an angle of inclination in the neighborhood of about 45° for the trailing edge face 187 assures that the cut material 111 departs the cutting area of the blades 135 and 136 without bunching up or otherwise becoming fouled.

As best seen in FIGURE 7, as each lobe 171 of the blade 135 is drawn past the outer blade 136 in cutting relationship, the slightly but increasingly curved leading edge 180 of each lobe maintains a substantially constant angle of attack with the cutting edge 154 on the fixed blade 136. Since the cutting edge 154 of the fixed outer blade 136 is inclined upwardly at an angle of approximately 30° from the base 152 of the blade 136, and the leading edge 180 is approximately horizontal at each point along its length when that point reaches the edge 154, it will be understood that a cutting angle of approximately 30° is maintained between the leading edge 180 of each lobe 171 and the cutting edge 154 of the blade 136, as the rotary blade 136 rotates. Maintenance of the constant angle assures fast, accurate, uninterrupted cutting.

As has been pointed out, the cutting tool 110 cuts rapidly and accurately for a considerable service life without sharpening. When sharpening is necessary, it is accomplished without any special tools or skills, by merely grinding down the planar surface 176 of the blade 135 on a fine grinder.

As has further been pointed out, the area 190 in which the rotating inner blade 135 and the fixed outer blade 136 begin to cut, as best seen in FIGURE 6, is in full view of the operator looking down between the walls 145 and 146 of the housing 137. Accordingly, the operator has no trouble following an intricate pattern, for example.

Although the tool 10 embodying features of one form of the present invention has been described utilizing an air motor 20 as a power source, and the tool 110 embodying features of another form of the present invention has been described utilizing an electric motor 120 as a power source, it will readily be understood that the motors might be interchanged. In other words, the tool 110 could readily be powered by an air motor, and correspondingly the tool 10 could readily be powered by an electric motor.

Two forms of the cutting tool arrangement embodying features of the present invention have been disclosed. Each employs a scissor-type cutting action to cut a fabric or generally similar material, for example, in any selected pattern, from simple straight line cuts to intricate curves, quickly and accurately without tearing or otherwise damaging the material. The novel construction of each of the cutting tools 10 and 110 permits their adjustment to cut materials in various attitudes and in relatively inaccessible locations, while keeping the point of cutting in full view of the operator to assure that a pattern can be accurately followed, for example. In the case of both of the tool constructions described and illustrated, a minimum amount of sharpening is required.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a tool for cutting light flexible material such as fabrics and the like, the improvement in cutting head assembly comprising: a generally circular blade rotatable in a first prescribed plane about an axis, a plurality of lobes formed around the periphery of said blade and defining cutting edge means, and a stationary blade lying in a second prescribed plane inclined to said first plane, said stationary blade having an elongated substantially straight base edge upon which said head assembly rides as the material is cut and a substantially straight cutting edge inclined at a predetermined angle to said base edge, said cutting edge cooperating with the cutting edge means on said lobes at a substantially constant cutting angle approximating said predetermined angle as said generally circular blade rotates.

2. In a tool for cutting light flexible material such as fabrics and the like, the improvement in cutting head assembly comprising: a generally circular blade rotatable in a first prescribed plane about an axis, a predetermined number of lobes formed around the periphery of said blade, said generally circular blade being a disc of finite thickness, one surface of said disc being substantially planar, the opposite surface of said disc being relieved adjacent its periphery to form a leading cutting edge and a trailing edge on each of said lobes, the relief adjacent each leading cutting edge forming an inclined face at a predetermined angle to said surfaces, the relief adjacent each trailing edge forming an inclined face at an angle greater than said predetermined angle to said one surface, and a stationary blade lying in a second prescribed plane inclined to said first plane, said stationary blade having an elongated base edge upon which said head rides as the material is cut and a substantially straight cutting edge inclined at another angle to said base edge, said cutting edge cooperating with the leading cutting edge on each of said lobes to effect a scissor cutting action as said generally circular blade rotates, the profile of each of said leading cutting edges being such that a substantially constant cutting angle approximately equal to said other angle is maintained between said leading cutting edges and said substantially straight cutting edge on said stationary blade.

3. The improvement in cutting head assembly of claim 2 further characterized in that said predetermined angle of incline of said leading edge faces is approximately 30° while said greater angle of incline of said trailing edge faces is approximately 45° to said one surface.

4. In a tool for cutting light flexible material such as fabrics and the like, the improvement in cutting head assembly comprising: a generally circular blade rotatable in a first prescribed plane about an axis, a predetermined number of lobes formed around the periphery of said blade and defining edge means, the edge means on each of said lobes including an elongated leading cutting edge and a shorter trailing edge, and a stationary blade lying in a second prescribed plane inclined to said first plane, said stationary blade having an elongated substantially straight base edge upon which said head rides as the material is cut and a substantially straight cutting edge inclined at a predetermined angle to said blade edge, said cutting edge cooperating with the leading cutting edge on each of said lobes to effect a scissor cutting action as said generally circular blade rotates, the profile of each of said leading cutting edges being such that a substantially constant cutting angle approximating said predetermined angle is maintained between said leading cutting edges and said relatively straight cutting edge on said stationary blade whereby said leading cutting edges are substantially parallel to said base edge at their point of cooperation with said straight cutting edge and their cooperation tends to draw material through the cutting head assembly.

5. The improvement in cutting head assembly of claim 4 further characterized in that said predetermined angle is approximately 30°.

References Cited by the Examiner

UNITED STATES PATENTS

| | | | |
|---|---|---|---|
| 1,796,463 | 3/1931 | Kaltenbach et al. | 30—240 |
| 2,360,557 | 10/1944 | Fremark | 30—240 |
| 2,701,911 | 2/1955 | Maescher | 30—240 |

FOREIGN PATENTS 225,742   4/1958   Australia.

WILLIAM FELDMAN, *Primary Examiner.*

J. C. PETERS, *Assistant Examiner.*